US011516455B2

(12) United States Patent
Zhang

(10) Patent No.: US 11,516,455 B2
(45) Date of Patent: Nov. 29, 2022

(54) ELECTRONIC DEVICE AND METHOD FOR CONTROLLING THE SAME

(71) Applicant: GUANGDONG OPPO MOBILE TELECOMMUNICATIONS CORP., LTD., Guangdong (CN)

(72) Inventor: Xueyong Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 83 days.

(21) Appl. No.: 17/175,681

(22) Filed: Feb. 14, 2021

(65) Prior Publication Data

US 2021/0176449 A1 Jun. 10, 2021

Related U.S. Application Data

(63) Continuation of application No. PCT/CN2019/090017, filed on Jun. 4, 2019.

(30) Foreign Application Priority Data

Aug. 22, 2018 (CN) .......................... 201810963394.9

(51) Int. Cl.
*H04N 13/25* (2018.01)
*H04N 13/257* (2018.01)
(Continued)

(52) U.S. Cl.
CPC .......... *H04N 13/25* (2018.05); *G01S 7/4816* (2013.01); *G01S 7/4912* (2013.01); *G01S 17/42* (2013.01);
(Continued)

(58) Field of Classification Search
CPC ........ G01S 17/42; G01S 17/86; G01S 17/894; G01S 7/4813; H04M 1/0264;
(Continued)

(56) References Cited

U.S. PATENT DOCUMENTS

| 2010/0207938 A1 | 8/2010 | Yau et al. |
| 2014/0368615 A1 | 12/2014 | Van Baar et al. |
| 2017/0251194 A1 | 8/2017 | Plank et al. |

FOREIGN PATENT DOCUMENTS

| CN | 104661008 | 5/2015 |
| CN | 104918034 | 9/2015 |

(Continued)

OTHER PUBLICATIONS

SIPO, First Office Action for CN Application No. 201810963394.9, dated Jun. 18, 2019.
(Continued)

*Primary Examiner* — Farzana Hossain
(74) *Attorney, Agent, or Firm* — Hodgson Russ LLP

(57) ABSTRACT

An electronic device (100) and a method for controlling the electronic device (100) are provided. The electronic device (100) includes a time-of-flight (TOF) module 20, a color camera 30, a monochrome camera (40), and a processor (10). The TOF module (20) is configured to capture a depth image of a subject. The color camera (30) is configured to capture a color image of the subject. The monochrome camera (40) is configured to capture a monochrome image of the subject. The processor (10) is configured to obtain a current brightness of ambient light in real time, and to construct a three-dimensional image of the subject according to the depth image, the color image, and the monochrome image when the current brightness is less than a first threshold.

19 Claims, 10 Drawing Sheets

(51) Int. Cl.
*H04N 13/254* (2018.01)
*G01S 17/894* (2020.01)
*G01S 17/42* (2006.01)
*H04N 5/247* (2006.01)
*G01S 7/481* (2006.01)
*G01S 7/4912* (2020.01)
*G01S 17/89* (2020.01)

(52) U.S. Cl.
CPC ............ *G01S 17/89* (2013.01); *G01S 17/894* (2020.01); *H04N 5/247* (2013.01); *H04N 13/254* (2018.05); *H04N 13/257* (2018.05)

(58) Field of Classification Search
CPC .......... H04M 1/72403; H04M 2250/52; H04N 13/25; H04N 13/254; H04N 13/257; H04N 13/271; H04N 5/2256; H04N 5/2258; H04N 5/23232; H04N 5/2354; H04N 5/247
See application file for complete search history.

(56) References Cited

FOREIGN PATENT DOCUMENTS

| | | |
|---|---|---|
| CN | 106454077 | 2/2017 |
| CN | 106772431 | 5/2017 |
| CN | 106791734 | 5/2017 |
| CN | 107133914 | 9/2017 |
| CN | 107147891 A | 9/2017 |
| CN | 107179592 A | 9/2017 |
| CN | 107528946 A | 12/2017 |
| CN | 206698329 | 12/2017 |
| CN | 107580209 | 1/2018 |
| CN | 107819992 A | 3/2018 |
| CN | 107846542 | 3/2018 |
| CN | 107995434 A | 5/2018 |
| CN | 108093242 | 5/2018 |
| WO | 2018053909 | 3/2018 |

OTHER PUBLICATIONS

SIPO, Second Office Action for CN Application No. 201810963394.9, dated Sep. 6, 2019.
SIPO, Decision of Rejection for CN Application No. 201810963394.9, dated Feb. 3, 2020.
SIPO, Notice of Review for CN Application No. 201810963394.9, dated Nov. 27, 2020.
WIPO, ISR for PCT/CN2019/090017, dated Jul. 24, 2019.
EPO, Extended European Search Report for EP Application No. 19851528.0, dated Aug. 9, 2021.
CNIPA, Office Action for CN 202010514377.4, dated Sep. 3, 2021.
CNIPA, Office Action for CN 202010514377.4, dated May 7, 2022.

ELECTRONIC DEVICE AND METHOD FOR CONTROLLING THE SAME

CROSS-REFERENCE TO RELATED APPLICATION(S)

The present application is a continuation of International Application No. PCT/CN2019/090017, filed Jun. 4, 2019, which claims priority to Chinese Patent Application No. 201810963394.9, filed Aug. 22, 2018, the entire disclosures of which are incorporated herein by reference.

TECHNICAL FIELD

The present disclosure relates to the field of consumer electronic products, and particularly to an electronic device and a method for controlling the same.

BACKGROUND

With the rapid development of electronic technology, electronic devices such as smart phones and tablet computers are becoming increasingly popular. The electronic device usually captures a two-dimensional image of a subject through a single camera.

SUMMARY

An electronic device and a method for controlling the electronic device are provided.

An electronic device is provided. The electronic device includes a time-of-flight (TOF) module, a color camera, a monochrome camera, and a processor. The TOF module is configured to capture a depth image of a subject. The color camera is configured to capture a color image of the subject. The monochrome camera is configured to capture a monochrome image of the subject. The processor is configured to obtain a current brightness of ambient light in real time, and to construct a three-dimensional image of the subject according to the depth image, the color image, and the monochrome image when the current brightness is less than a first threshold.

A method for controlling the electronic device is provided. The electronic device includes a ToF module, a color camera, and a monochrome camera. The method for controlling the electronic device includes the following. The ToF module captures a depth image of a subject. The color camera captures a color image of the subject. A current brightness of ambient light is obtained in real time. The monochrome camera captures a monochrome image of the subject when the current brightness is less than a first threshold. A three-dimensional image of the subject is constructed according to the depth image, the color image, and the monochrome image.

The additional aspects and advantages of the implementations of the present disclosure will be partly presented in the following description, and partly become apparent in the following description, or be appreciated in practicing of the implementations of the present disclosure.

BRIEF DESCRIPTION OF THE DRAWINGS

The above and/or additional aspects and advantages of the present disclosure will become obvious and easy to understand from the description of the implementations with reference to the accompanying drawings below, in which.

DETAILED DESCRIPTION OF ILLUSTRATED EMBODIMENTS

Figure 1:
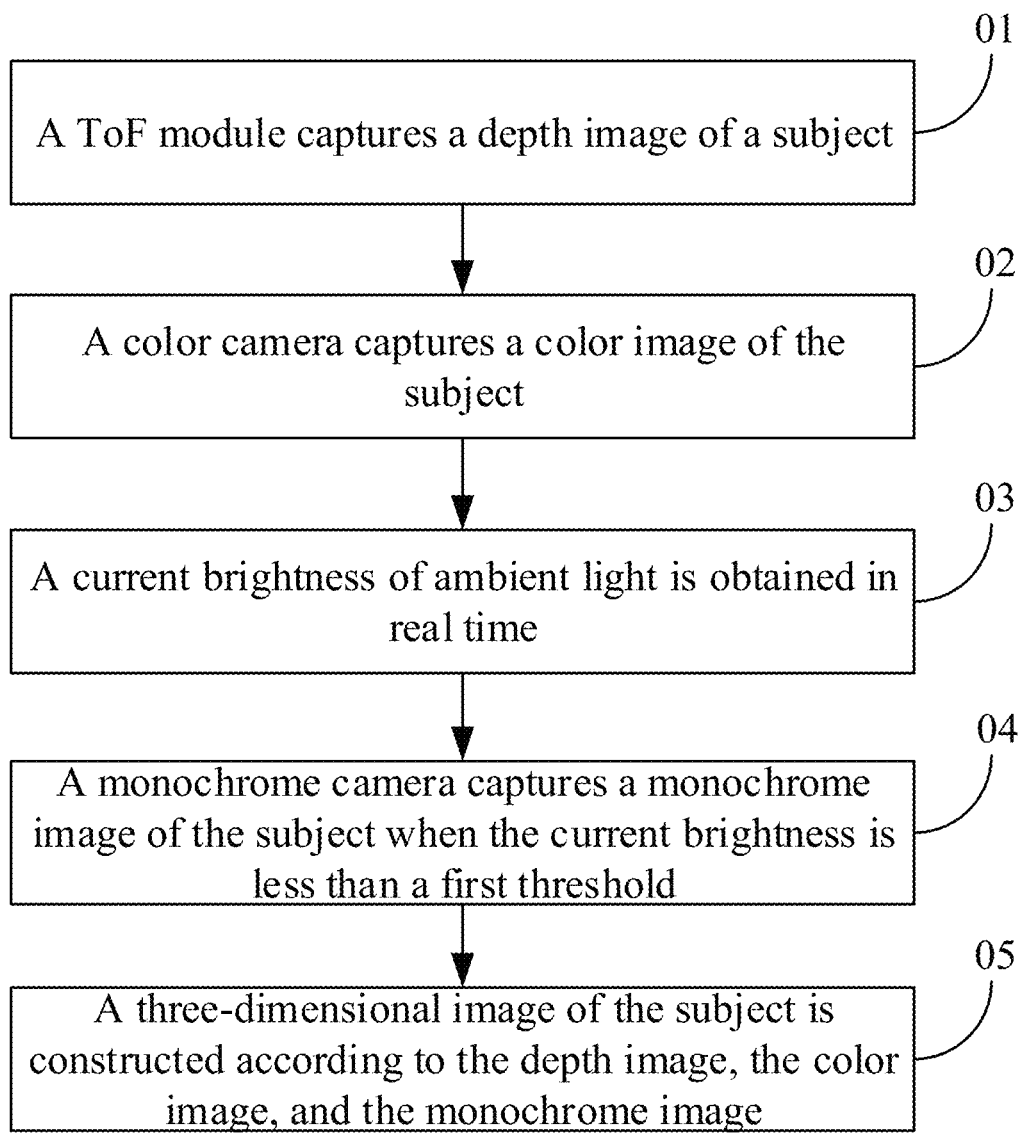
FIG. 1 is a schematic flow chart of a method for controlling an electronic device according to implementations of the present disclosure.

Implementations of the present disclosure will be further described hereinafter with reference to the accompanying drawings. Identical or similar reference numerals in the accompanying drawings refer to identical or similar elements or functionally identical or similar elements throughout the whole context.

In addition, the implementations of the present disclosure described hereinafter with the accompanying drawings are exemplary and used to explain implementations of the present disclosure rather than limiting the present disclosure.

Figure 2:
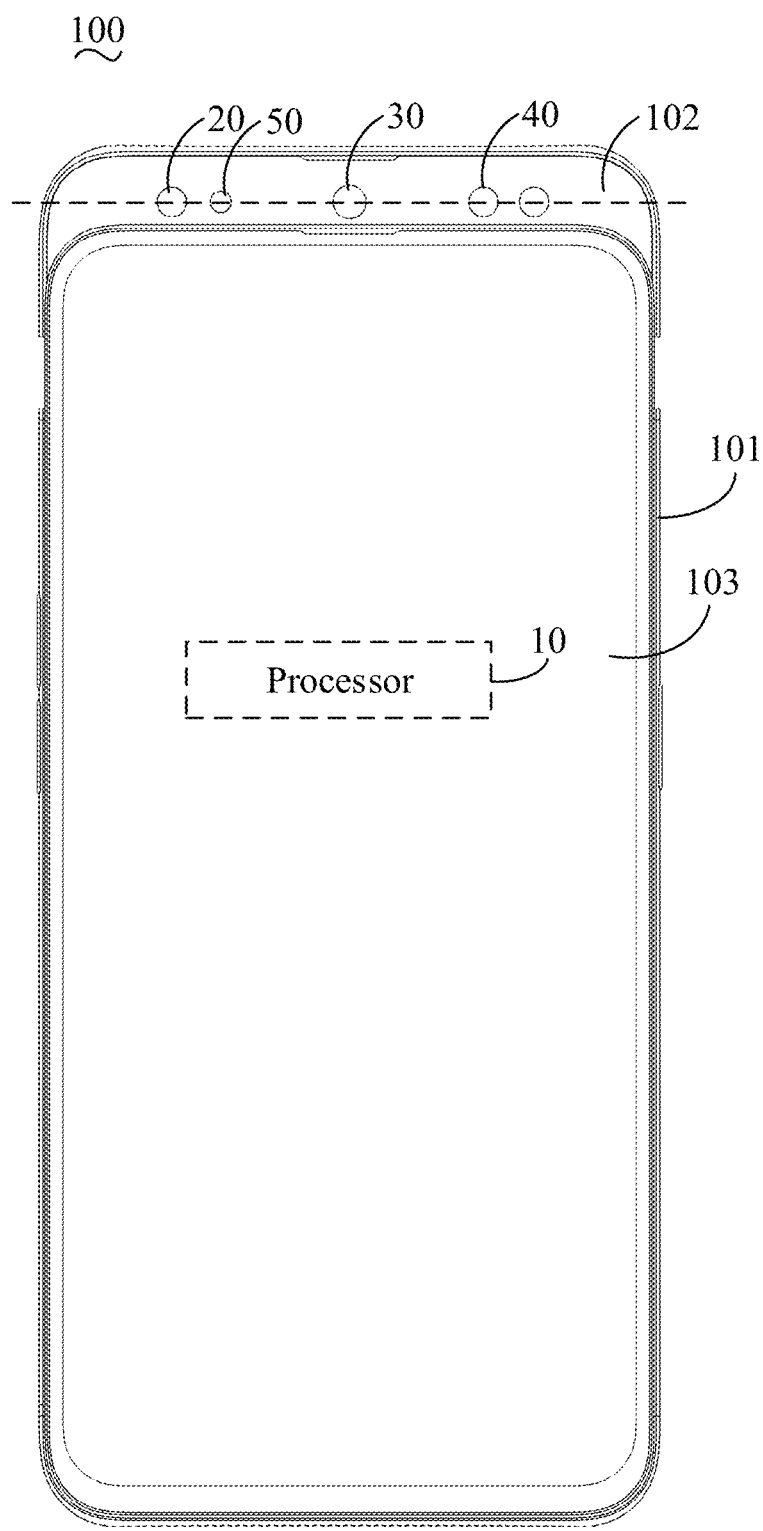
FIG. 2 is a schematic structural view of an electronic device according to implementations of the present disclosure.

Referring to FIG. 2, an electronic device 100 is provided. The electronic device 100 includes a time-of-flight (TOF) module 20, a color camera 30, a monochrome camera 40, and a processor 10. The TOF module 20 is configured to capture a depth image of a subject. The color camera 30 is configured to capture a color image of the subject. The monochrome camera 40 is configured to capture a monochrome image of the subject. The processor 10 is configured to obtain a current brightness of ambient light in real time, and to construct a three-dimensional image of the subject according to the depth image, the color image, and the monochrome image when the current brightness is less than a first threshold.

In implementations, the ToF module 20 is disposed at one side of the color camera 30 and the monochrome camera 40 is disposed at the other side of the color camera 30.

In implementations, the processor 10 is further configured to construct a fused image of the subject according to the color image and the monochrome image when the current brightness is less than the first threshold.

In implementations, the processor 10 is further configured to construct the three-dimensional image of the subject according to the depth image and the color image when the current brightness is greater than or equal to the first threshold.

In implementations, the electronic device 100 further includes a flash 50. The flash 50 is turned on when the current brightness is greater than or equal to the first threshold and less than a second threshold.

In implementations, it is noted that the fused image is obtained through image fusion. Image fusion refers to a process of combining two or more images into one composite image, which integrates the information contained within the individual images. The image thus obtained has rich information content compared to any of the original individual images. The goal of the fusion process is to evaluate the information at each pixel location in the original individual images and retain the information from that image which best represents the true scene content or enhances the utility of the fused image for a particular application.

Referring to FIGS. 5 to 8, in implementations, the ToF module 20 includes a first substrate assembly 21, a cushion block 22, a light emitter 23, and a light receiver 24. The first substrate assembly 21 includes a first substrate 211 and a flexible circuit board 212 connected with the first substrate 211. The cushion block 22 is disposed on the first substrate 211. The light emitter 23 is disposed on the cushion block 22 and configured to emit light signals outward. The flexible circuit board 212 is bent with one end connected to the first substrate 211 and the other end connected to the light emitter 23. The light receiver 24 is disposed on the first substrate 211 and configured to receive the reflected light signals which are emitted by the light emitter 23. The light receiver 24 includes a case 241 and an optical element 242 disposed on the case 241. The case 241 is connected with the cushion block 22.

In implementations, the cushion block 241 and the case 242 are integrally formed.

Figure 9:
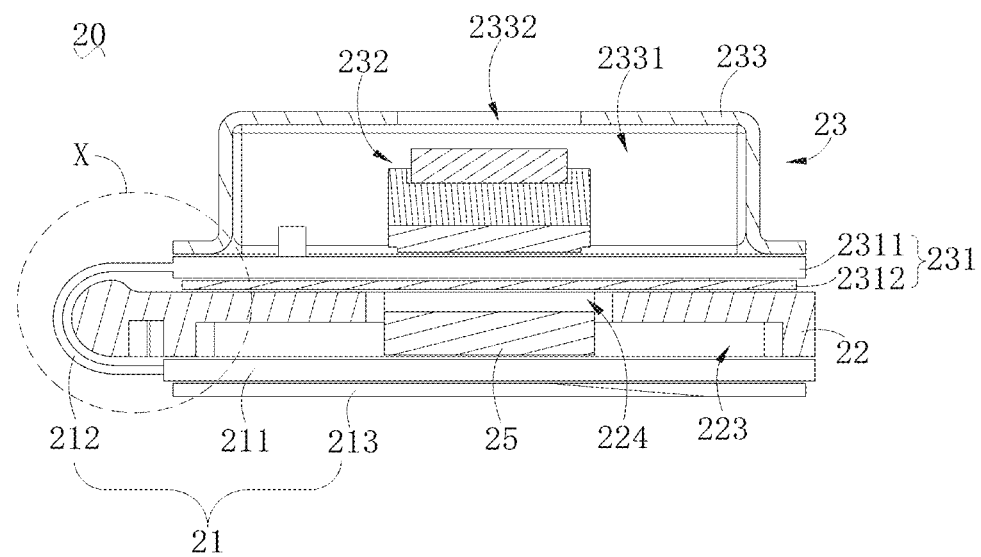
FIG. 9 is a schematic cross-sectional view of the ToF module taken along line IX-IX in FIG. 6.

Referring to FIG. 9, in implementations, the light emitter 23 includes a second substrate assembly 231, a light source assembly 232, and a case 233. The second substrate assembly 231 is disposed on the cushion block 22 and connected with the flexible circuit board 212. The light source assembly 232 is disposed on the second substrate assembly 231 and configured to emit the light signals. The case 233 is disposed on the second substrate assembly 231 and defines an accommodation space 2331 for accommodating the light source assembly 232.

In implementations, the second substrate assembly 231 includes a second substrate 2311 and a reinforcing member 2312. The second substrate 2311 is connected with the flexible circuit board 212. The light source assembly 232 is disposed on one side of the second substrate 2311 and the reinforcing member 2312 is disposed on the other side of the second substrate 2311.

In implementations, the reinforcing member 2312 and the cushion block 22 are formed integrally. Alternatively, the reinforcing member 2312 and the cushion block 22 are formed separately.

Figure 11:
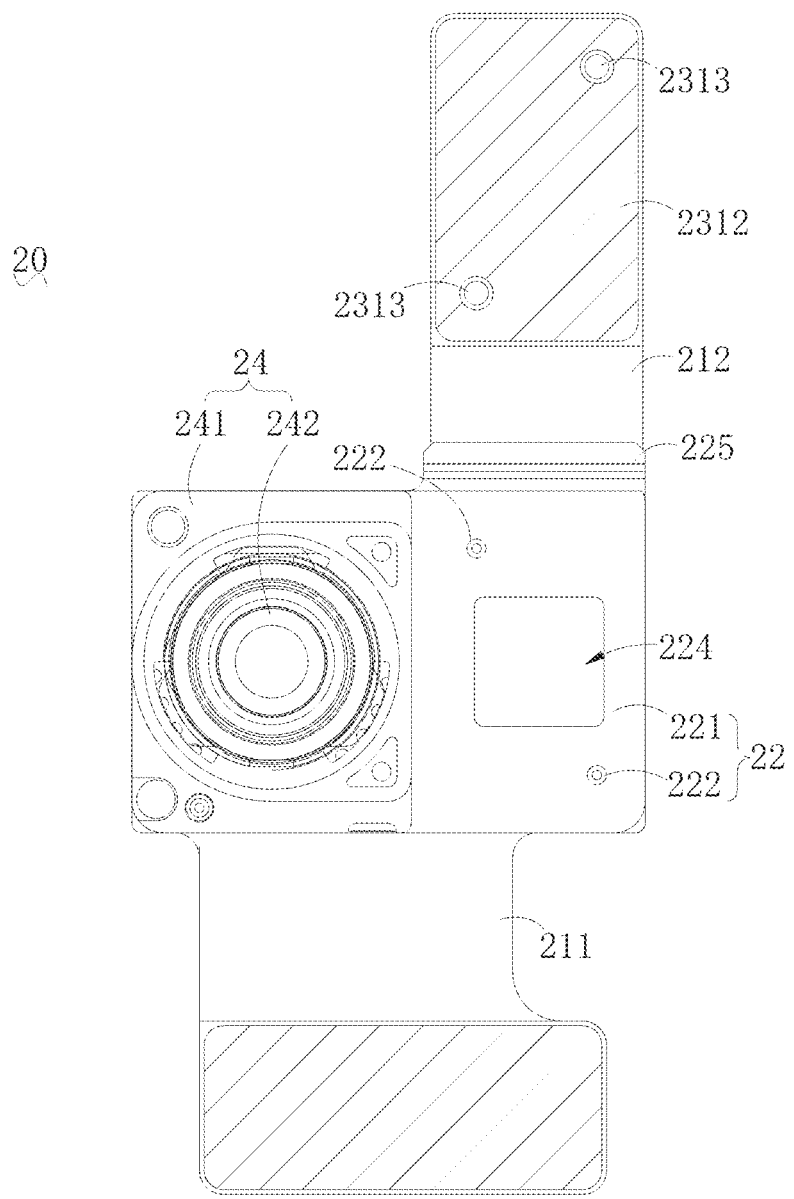
FIG. 11 is a schematic front view of a ToF module when a flexible circuit board is not bent according to implementations of the present disclosure.

Referring to FIG. 11, in implementations, the reinforcing member 2312 includes a first positioning member 2313. The cushion block 22 includes a body 221 and a second positioning member 222 formed on the body 221. The second substrate assembly 231 is disposed on the cushion block 22. The first positioning member 2313 matches with the second positioning member 222.

Figure 10:
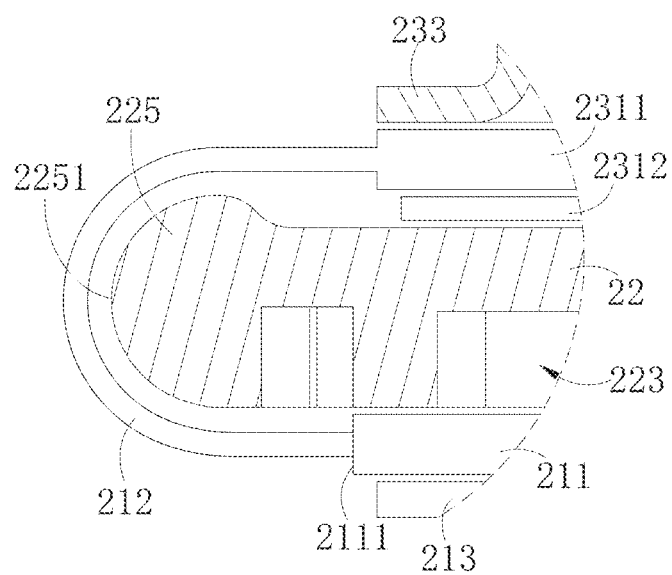
FIG. 10 is an enlarged schematic view of structures in circle X of the ToF module illustrated in FIG. 9.

Referring to FIG. 9 and FIG. 10, in implementations, the cushion block 22 defines an accommodating cavity 223 on a side of the cushion block 22 close to the first substrate 211. The ToF module 20 further includes an electronic component 25 disposed on the first substrate 211. The electronic component 25 is accommodated in the accommodating cavity 223.

Referring to FIG. 9 and FIG. 11, in implementations, the cushion block 22 defines at least one through hole 224 in communication with the accommodating cavity 223. At least one electronic component 25 extends into the at least one through hole 224.

Figure 7:
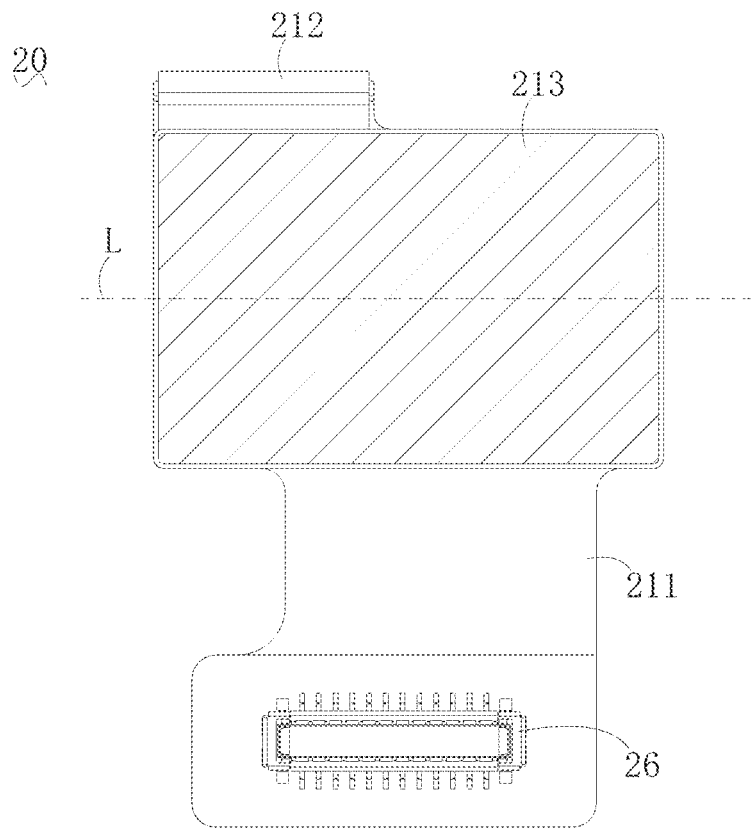
FIG. 7 is a schematic bottom view of a ToF module according to implementations of the present disclosure.

Referring to FIG. 7 and FIG. 9, in implementations, the first substrate assembly 21 further includes a reinforcing plate 213. The reinforcing plate 213 is connected with the first substrate 211 at a side of the first substrate 211 away from the cushion block 22.

Referring to FIGS. 9 to 11, in implementations, the cushion block 22 includes a protrusion portion 211 protruding relative to a side edge 2111 of the first substrate 211. The flexible circuit board 212 is bent around the protrusion portion 225.

Figure 5:
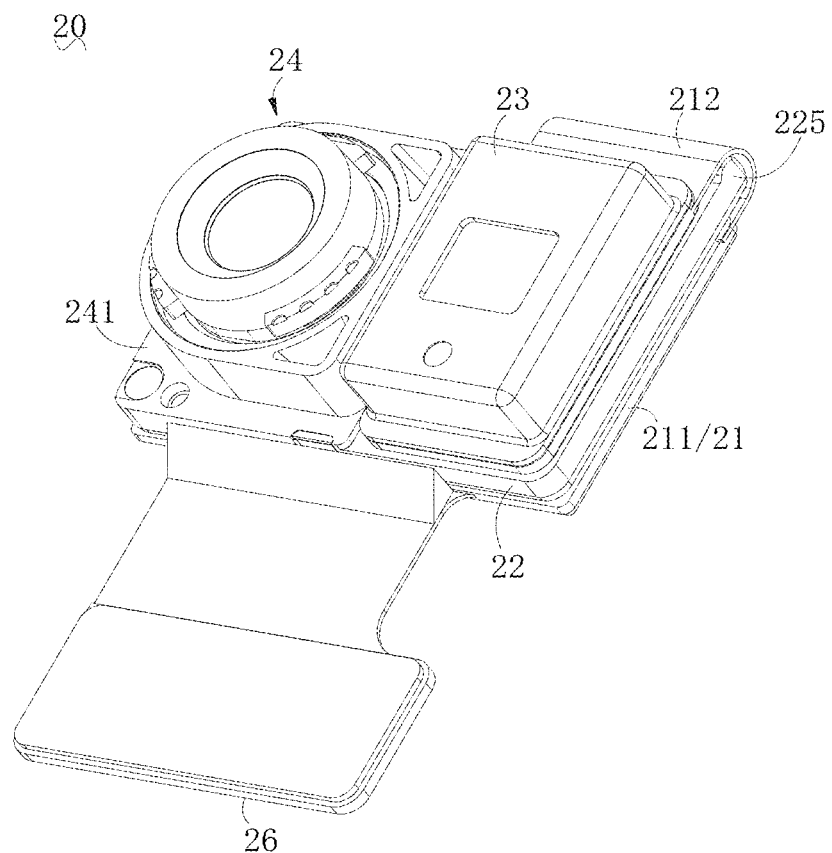
FIG. 5 is a schematic perspective view of a ToF module according to implementations of the present disclosure.
Figure 6:
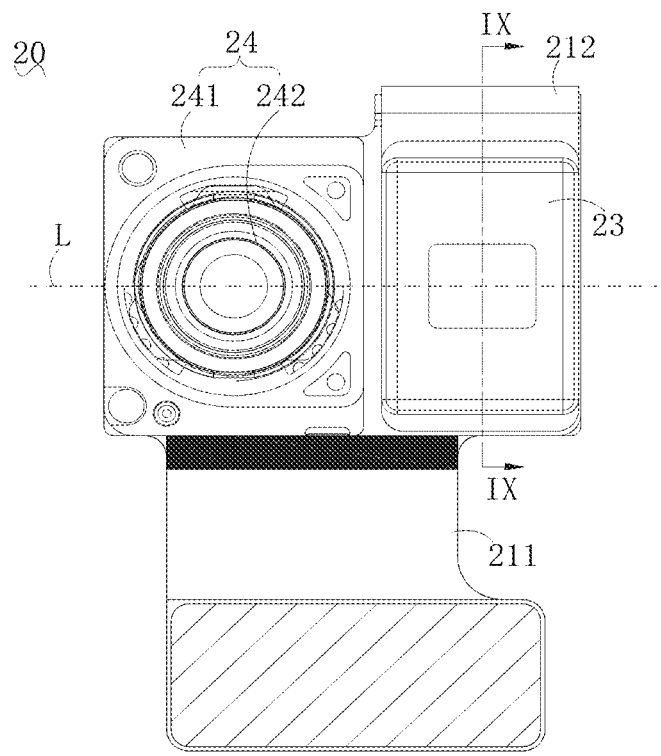
FIG. 6 is a schematic top view of a ToF module according to implementations of the present disclosure.

Referring to FIGS. 5 to 7, in implementations, the ToF module 20 further includes a connector 26 connected with the first substrate 211. The connector 26 is configured to connect the first substrate assembly 21 and external devices. The connector 26 is connected with one end of the first substrate 211 and the flexible circuit board 212 is connected with the other end of the first substrate 211.

Refer to FIG. 6 and FIG. 7, in implementations, the light emitter 23 and the light receiver 24 are arranged along line L. The connector 26 is disposed to one side of line L and the flexible circuit board 212 is disposed to the other side of line L.

Referring to FIG. 1 and FIG. 2, the electronic device 100 according to the present disclosure includes the ToF module 20, the color camera 30, and the monochrome camera 40. A method for controlling the electronic device 100 begins at block 01.

At block 01: The ToF module 20 captures a depth image of a subject.

At block 02: The color camera 30 captures a color image of the subject.

At block 03: A current brightness of ambient light is obtained in real time.

At block 04: The monochrome camera 40 captures a monochrome image of the subject when the current brightness is less than a first threshold.

At block 05: A three-dimensional image of the subject is constructed according to the depth image, the color image, and the monochrome image.

In some implementation, the ToF module 20 is disposed at one side of the color camera 30 and the monochrome camera 40 is disposed at the other side of the color camera 30.

Figure 3:
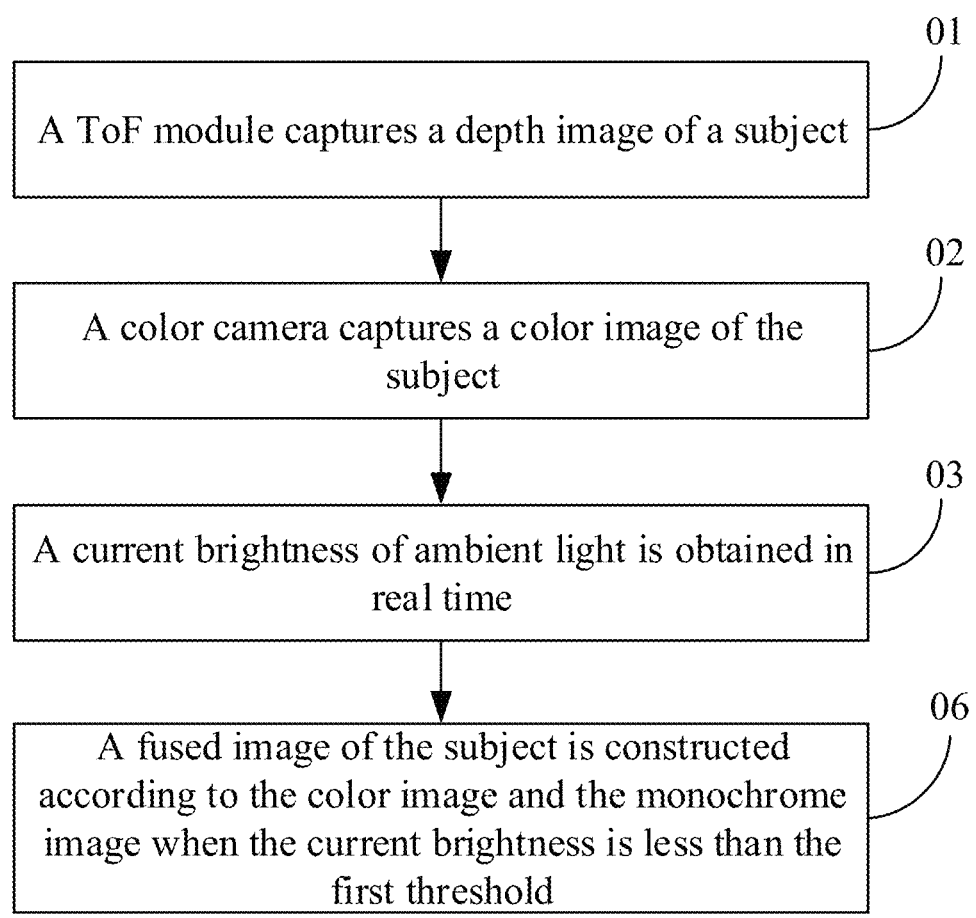
FIG. 3 and FIG. 4 are schematic flow charts of methods for controlling an electronic device according to implementations of the present disclosure.

Referring to FIG. 3, in implementations, the following is further conducted.

At block 06: A fused image of the subject is constructed according to the color image and the monochrome image when the current brightness is less than the first threshold.

Figure 4:
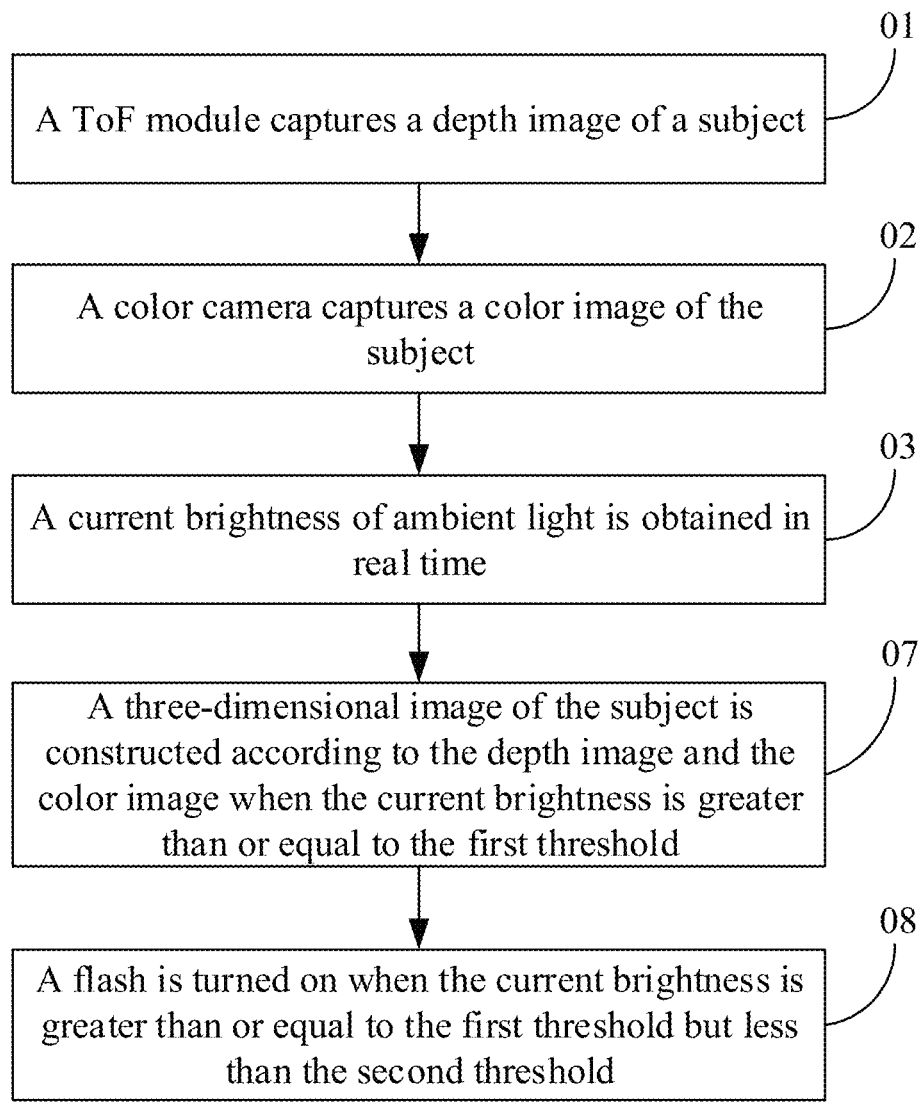

Referring to FIG. 4, in implementations, the following is further conducted.

At block 07: The three-dimensional image of the subject is constructed according to the depth image and the color image when the current brightness is greater than or equal to the first threshold.

Referring to FIG. 2 and FIG. 4, in implementations, the electronic device 100 further includes a flash 50. The method for controlling the electronic device 100 further includes the following.

At block 08: The flash 50 is turned on when the current brightness is greater than or equal to the first threshold but less than the second threshold.

Referring to FIG. 1 and FIG. 2, a method for controlling the electronic device 100 is provided according to implementations of the present disclosure. The electronic device 100 includes the ToF module 20, the color camera 30 (i.e., an RGB camera), and the monochrome camera 40 (i.e., a Mono camera). The method for controlling the electronic device 100 begins at block 01.

At block 01: The ToF module 20 captures a depth image of a subject.

At block 02: The color camera 30 captures a color image of the subject.

At block 03: A current brightness of ambient light is obtained in real time.

At block 04: The monochrome camera 40 captures a monochrome image of the subject when the current brightness is less than a first threshold.

At block 05: A three-dimensional image of the subject is constructed according to the depth image, the color image, and the monochrome image.

Referring to FIG. 2, the electronic device 100 is provided. The electronic device 100 includes the ToF module 20, the color camera 30, the monochrome camera 40, and the processor 10. The method for controlling the electronic device 100 according to implementations of the present disclosure is implemented by the electronic device 100 according to implementations of the present disclosure. For example, the ToF module 20 is configured to execute the operation at block 01. The color camera 30 is configured to execute the operation at block 02. The processor 10 is configured to execute the operations at block 03 and block 05. The monochrome camera 40 is configured to execute the operation at block 04. In other words, the ToF module 20 is configured to capture the depth image of the subject. The color camera 30 is configured to capture the color image of the subject. The monochrome camera 40 is configured to capture the monochrome image of the subject. The processor 10 is configured to obtain the current brightness of the ambient light in real time, and to construct the three-dimensional image of the subject according to the depth image, the color image, and the monochrome image when the current brightness is less than the first threshold.

It is noted that with the rapid development of electronic technology, electronic devices such as smart phones and tablet computers are becoming increasingly popular. The electronic device usually captures a two-dimensional image of a subject through a single camera, and the photographing effect is not good, which affects the user experience.

In the electronic device 100 and the method for controlling the electronic device 100 according to implementations of the present disclosure, when the current brightness of the ambient light is less than the first threshold, the three-dimensional image of the subject is constructed according to the depth image, the color image, and the monochrome image. As such, a good photographing effect is achieved, which is beneficial to improving the user experience.

In an example, the electronic device 100 may be a mobile phone, a tablet computer, a smart watch, a smart bracelet, a smart wearable device, etc. Mobile phone is taken as an example of the electronic device 100 to describe implementations of the present disclosure. The electronic device 100 however is not limited to a mobile phone.

The electronic device 100 may include a housing 101 and a support 102. The ToF module 20, the color camera 30, and the monochrome camera 40 are disposed on the support 102. The ToF module 20, the color camera 30, the monochrome camera 40, and the support 102 are received in the housing 101 and capable of extending from the housing 101. When the ToF module 20 intends to capture the depth image of the subject, the support 102 drives the ToF module 20 to move out of the housing 101 to capture the depth image; when the color camera 30 intends to capture the color image of the subject, the support 102 drives the color camera 30 to move out of the housing 101 to capture the color image; similarly, when the monochrome camera 40 intends to capture the monochrome image of the subject, the support 102 drives the monochrome camera 40 to move out of the housing 101 to capture the monochrome image of the subject. In implementations of the present disclosure, each of the ToF module 20, the color camera 30, and the monochrome camera can be a front camera or a rear camera. The subject can be a person, an object, or other objects that a user wishes to photograph. In other implementations, the housing 101 may define a through hole (not illustrated) therein. Each of the ToF module 20, the color camera 30, and the monochrome camera 40 is securely disposed in the housing 101 and corresponds to the through hole. In another implementation, the electronic device 100 has a display screen 103 which is disposed on the housing 101 and defines a through hole (not illustrated) therein. Each of the ToF module 20, the color camera 30, and the monochrome camera 40 is disposed below the display screen 103 and corresponds to the through hole.

The electronic device 100 may further include an ambient light sensor (not illustrated). The ambient light sensor is configured to detect the current brightness of ambient light and send the current brightness to the processor 10.

During operation of the electronic device 100, the processor 10 can obtain the current brightness of the ambient light before the ToF module 20 captures the depth image of the subject and/or the color camera 30 captures the color image of the subject. When the current brightness is less than the first threshold, the ToF module 20 captures the depth image of the subject, and at the same time, the color camera 30 captures the color image of the subject and the monochrome camera 40 captures the monochrome image of the subject. Since the ToF module 20, the color camera 30, and the monochrome camera 40 are configured to capture images at the same time, compared with capturing images sequentially, the time spent on constructing the three-dimensional image of the subject is effectively saved, and the user experience is improved. Of course, the processor 10 may also obtain the current brightness of the ambient light after the ToF module 20 captures the depth image of the subject and the color camera 30 captures the color image of the subject. The monochrome camera 40 will be turned on to capture the monochrome image of the subject only when the current brightness is less than the first threshold, thereby avoiding turning on the monochrome camera 40 unnecessarily, and decreasing the power consumption of the electronic device 100.

In other implementations, capturing the depth image of the subject by the ToF module 20 (that is, the operation at block 01), capturing the color image of the subject by the color camera 30 (that is, the operation at block 02), capturing the current brightness of the ambient light by the processor 10 (that is, the operation at block 03), and capturing the monochrome image of the subject by the monochrome camera 40 (that is, the operation at block 04) can be implemented in any order, as long as the three-dimensional image of the subject can be constructed according to the depth image, the color image, and the monochrome image.

In an implementation, the processor 10 is configured to construct the three-dimensional image of the subject according to the depth image, the color image, and the monochrome image as follows. Depth information of each pixel in the depth image is obtained. Color information of each pixel in the color image is obtained. Brightness information of each pixel in the monochrome image is obtained. The three-dimensional image is generated according to the depth information, the color information, and the brightness information corresponding to each pixel.

In implementations of the present disclosure, the ToF module 20, the color camera 30, and the monochrome camera 40 are configured to capture images independently. In low-light (that is, dark) environments, the monochrome camera 40 can capture an image with enhanced image quality in terms of noise, brightness, color, and details in comparison with the color camera 30, and thus the quality of low-light or night-scene shooting is improved. As such, when generating a three-dimensional image, the color information is provided by the color camera 30, the brightness and details information is provided by the monochrome camera 40, and the depth information is provided by the ToF module 20, so as to obtain the three-dimensional image through synthesizing, which has a desired image quality in terms of color, brightness, details, and noise in low-light environments, and thus achieve good three-dimensional (3D) effects and augmented reality (AR) applications in low-light environments.

Referring to FIG. 3, in implementations, the following is further conducted.

At block 06: The fused image of the subject is constructed according to the color image and the monochrome image when the current brightness is less than the first threshold.

Referring to FIG. 2, in implementations, the processor 10 is configured to execute the operation at block 06. In other words, the processor 10 is configured to construct the fused image of the subject according to the color image and the monochrome image when the current brightness is less than the first threshold.

In an example, the processor 10 is configured to construct the fused image of the subject according to the color image and the monochrome image as follows. The color information of each pixel in the color image is obtained. The brightness information of each pixel in the monochrome image is obtained. The three-dimensional image is generated according to the color information and the brightness information corresponding to each pixel.

In implementations of the present disclosure, the color camera 30 and the monochrome camera 40 are configured to capture images independently. In low-light environments, the monochrome camera 40 can capture an image with enhanced image quality in terms of noise, brightness, color, and details compared with the color camera 30, and thus the quality of low-light or night-scene shooting is improved. As such, when generating the fused image, the color information is provided by the color camera 30 and the brightness and details information is provided by the monochrome camera 40, so as to obtain a two-dimensional image through synthesizing, which has desired image quality in terms of color, brightness, details, and noise in low-light environments, and thus achieve good photographic effect in low-light environments.

Further, when the current brightness is less than the first threshold, the processor 10 is configured to construct the three-dimensional image or the fused image of the subject according to a user input (for example, an image type selected by a user).

Referring to FIG. 4, in implementations, the following is further conducted.

At block 07: The three-dimensional image of the subject is constructed according to the depth image and the color image when the current brightness is greater than or equal to the first threshold.

Referring to FIG. 2, in implementations, the processor 10 is configured to execute the operation at block 07. In other words, the processor 10 is configured to construct the three-dimensional image of the subject according to the depth image and the color image when the current brightness is greater than or equal to the first threshold.

In an example, if the current brightness is greater than or equal to the first threshold, it indicates that the current environment is not a low-light environment, and thus the processor 10 can construct the three-dimensional image of the subject according to the depth image and the color image directly. At this time, the monochrome camera 40 does not need to operate, which is beneficial to reducing the power consumption of the electronic device 100.

In an implementation, assume that the first threshold is L1 and the current brightness is 10. When 10 is less than L1, the electronic device 100 collects the monochrome image of the subject through the monochrome camera 40, and then constructs the three-dimensional image of the subject according to the depth image, the color image, and the monochrome image, or constructs the fused image of the subject according to the color image and the monochrome image. When 10 is greater than L1, the electronic device 100 does not need to collect the monochrome image of the subject through the monochrome camera 40, and the three-dimensional image of the subject can be constructed according to the depth image and the color image directly, as such, the power consumption of the electronic device 100 can be reduced.

In another implementation, since the processor 10 obtains the current brightness of the ambient light in real time, the electronic device 100 can determine, in real time, whether to collect the monochrome image of the subject through the monochrome camera 40 according to the current brightness. Assume that the first threshold is L0, at a first time point, a current brightness of the ambient light obtained by the processor is 11, and at a second time point, a current brightness of the ambient light obtained by the processor is 12. When 11 is less than L0, the electronic device 100 collects the monochrome image of the subject through the monochrome camera 40. When 12 is greater than or equal to L0, the electronic device 100 does not need to collect the monochrome image of the subject through the monochrome camera 40, and the processor 10 constructs the three-dimensional image of the subject according to the depth image and the color image.

Referring to FIG. 2 and FIG. 4, in implementations, the electronic device 100 also includes the flash 50. The following is further conducted.

At block 08: The flash 50 is turned on when the current brightness is greater than or equal to the first threshold but less than the second threshold.

Referring to FIG. 2, in implementations, the flash 50 is configured to execute the operation at block 08. In other words, the flash 50 can be turned on when the current brightness is greater than or equal to the first threshold but less than the second threshold.

In an example, if the current brightness is less than the second threshold, it indicates that the current brightness of the ambient light may be slightly low to some extent. At this time, the electronic device 100 does not collect the monochrome image of the subject through the monochrome camera 40, but turns on the flash 50 to emit light, thereby ensuring the quality of the color image collected by the color camera 30 as well as reducing the power consumption of the monochrome camera 40 since the monochrome camera 40 is not operated. If the current brightness is less than the first threshold, it indicates that the current brightness of the ambient light is extremely low, in this case, the quality of the color image collected by the color camera 30 still cannot be guaranteed even if the flash 50 is turned on to emit light. At this time, the electronic device 100 collects the monochrome image of the subject through the monochrome camera 40 rather than turning on the flash 50, thereby reducing the power consumption of the flash 50 as well as ensuring the image quality in low-light environments. The method of controlling the electronic device 100 according to implementations of the present disclosure can keep a balance between the power consumption of the electronic device 100 and the quality of the captured image.

Referring to FIG. 2, in implementations, the ToF module 20 is disposed close to one side of the color camera 30 and the monochrome camera 40 is disposed close to the other side of the color camera 30.

The color camera 30 is located between the ToF module 20 and the monochrome camera 40. On the one hand, when the processor 10 constructs the three-dimensional image of the subject according to the depth image and the color image, a parallax between the ToF module 20 and the color camera 30 is relatively small, which is beneficial to constructing a three-dimensional image with high quality. On the other hand, when the processor 10 constructs the fused image of the subject according to the color image and the monochrome image, a parallax between the color camera 30 and the monochrome camera 40 is relatively small, which is beneficial to constructing a fused image with high quality.

As an example, the center of the ToF module 20, the center of the color camera 30, and the center of the monochrome camera 40 are on the same line in sequence. On the one hand, a length of the support 102 in a direction from a top of the electronic device 100 (that is, a side of the electronic device 100 close to the support 102) to a bottom (that is, a side of the electronic device 100 away from the support 102) of the electronic device 100 can be decreased. On the other hand, the support 102 drives the ToF module 20, the color camera 30, and the monochrome camera 40 to move toward the outside of the housing 101 to extend from the housing 101 synchronously, such that the ToF module 20, the color camera 30, and the monochrome camera 40 are structurally designed to ensure synchronous movement and save shooting time.

In an example, the ToF module 20 in implementations of the present disclosure may be designed as follows.

Referring to FIGS. 5 to 8, the ToF module 20 includes the first substrate assembly 21, the cushion block 22, the light emitter 23, and the light receiver 24. The first substrate assembly 21 includes the first substrate 211 and the flexible circuit board 212 connected with the first substrate 211. The cushion block 22 is disposed on the first substrate 211. The light emitter 23 is disposed on the cushion block 22 and configured to emit light signals outward. The flexible circuit board 212 is bent with one end connected to the first substrate 211 and the other end connected to the light emitter 23. The light receiver 24 is disposed on the first substrate 211 and configured to receive the reflected light signals which are emitted by the light emitter 23. The light receiver 24 includes the case 241 and the optical element 242 disposed on the case 241. The case 241 is connected with the cushion block 22.

In the electronic device 100 according to implementations of the present disclosure, since the light emitter 23 is disposed on the cushion block 22, the cushion block 22 allows the light emitter 23 to be located at a higher height, accordingly, a light-emitting surface of the light emitter 23 is higher. The light signals emitted by the light emitter 23 are not easily blocked by the light receiver 24, so that the light signals can be completely illuminated on the subject.

In an example, the first substrate assembly 21 includes the first substrate 211 and the flexible circuit board 212. The first substrate 211 may be a printed circuit board or a flexible circuit board. The first substrate 211 may be provided with control circuits of the ToF module 20. The flexible circuit board 212 has one end connected with the first substrate 211. The flexible circuit board 212 can be bent at a certain angle, such that components connected at either end of the flexible circuit board can be positioned more flexibly.

Referring to FIG. 5 and FIG. 9, the cushion block 22 is disposed on the first substrate 211. In an example, the cushion block 22 is carried on and in contact with the first substrate 211. The cushion block 22 can be boned with the first substrate 211 via an adhesive or the like. The cushion block 22 may be made of metal, plastic, etc. In implementations of the present disclosure, a surface of the cushion block 22 which is boned with the first substrate 211 may be flat, and a surface of the cushion block 2 opposite to the surface boned with the cushion block 22 may also be flat, such that the light emitter 23 has a good stability when being placed on the cushion block 22.

The light emitter 23 is configured to emit light signals outward. In an example, the light signals can be infrared lights. The light signals can be a dot matrix light spot emitted to the subject. The light signal is emitted from the light emitter 23 at a certain divergence angle. The light emitter 23 is disposed on the cushion block 22. In implementations of the present disclosure, the light emitter 23 is disposed on a side of the cushion block 22 opposite to the first substrate 211. In other words, the cushion block 22 spaces the first substrate 211 apart from the light emitter 23, such that there is a height difference between the light emitter 23 and the first substrate 211. The light emitter 23 is also connected with the flexible circuit board 212. The flexible circuit board 212 is bent. The flexible circuit board 212 has one end connected with the first substrate 211 and the other end connected with the light emitter 23, so as to transmit control signals of the light emitter 23 from the first substrate 211 to the light emitter 23, as well as to transmit feedback signals of the light emitter 23 (for example, time information and frequency information of light-emitting signals of the light emitter 23, temperature information of the light emitter 23, etc.) to the first substrate 211.

Figure 8:
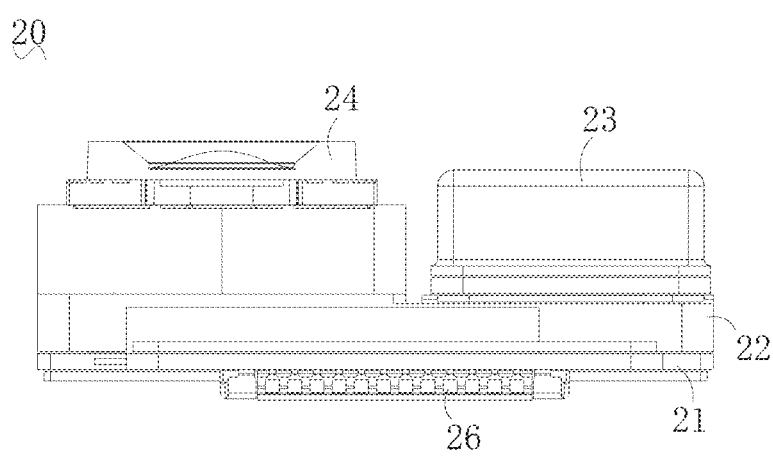
FIG. 8 is a schematic side view of a ToF module according to implementations of the present disclosure.

Referring to FIG. 5, FIG. 6, and FIG. 8, the light receiver 24 is configured to receive the reflected light signals, which is emitted by the light emitter 23. The light receiver 24 is disposed on the first substrate 211. A surface of the light receiver 24 in contact with the first substrate 211 is substantially flush with a surface of the cushion block 22 in contact with the first substrate 211 (that is, the light receiver 24 and the cushion block 22 are disposed on the same plane). In an implementation, the light receiver 24 includes the case 241 and the optical element 242. The case 241 is disposed on the first substrate 211. The optical element 242 is disposed on or inside the case 241. The case 241 may include a lens holder and a lens barrel of the light receiver 24. The optical element 242 may include elements such as lenses received in the case 241. Further, the light receiver 24 may also include a photosensitive chip (not illustrated). The light signals reflected by the subject (for example, an object to be detected) are transmitted to the photosensitive chip through the optical element 242, and then the photosensitive chip responds to the light signals. The ToF module 20 calculates a time difference between transmission of the light signal by the light emitter 23 and reception of the light signal, which is reflected by the subject, by the photosensitive chip, and further obtains the depth information of the subject. The depth information can be used for distance measurement, generation of depth image, or 3D modeling, etc. In implementations of the present disclosure, the case 241 is connected with the cushion block 22. In an example, the case 241 and the cushion block 22 may be formed integrally. For example, the case 241 and the cushion block 22 are made of the same material and are integrally formed by injection molding, cutting, etc. Alternatively, the case 241 and the cushion block 22 are made of different materials, and are integrally formed by two-color injection molding. The case 241 and the cushion block 22 can also be formed separately and match with each other to be connected together. When assembling the ToF module 20, the case 241 and the cushion block 22 can be integrally connected first, and then disposed on the first substrate 211. Alternatively, one of the case 241 and the cushion block 22 can be arranged on the first substrate 211 first, and then the other is arranged on the first substrate 211 in such a manner that the case 241 and the cushion block 22 are connected.

In the electronic device 100 according to implementations of the present disclosure, since the light emitter 23 is disposed on the cushion block 22, the cushion block 22 allows the light emitter 23 to be located at a higher height, accordingly, the light-emitting surface of the light emitter 23 is higher. The light signals emitted by the light emitter 23 are not easily blocked by the light receiver 24, so that the light signals can be completely illuminated on the subject. The light-emitting surface of the light emitter 23 can be flush with a light-incident surface of the light receiver 24. Alternatively, the light-emitting surface of the light emitter 23 can be slightly lower or higher than the light-incident surface of the light receiver 24.

Referring to FIG. 7 and FIG. 9, in implementations, the first substrate assembly 21 further includes the reinforcing plate 213. The reinforcing plate 213 is connected with the first substrate 211 at a side of the first substrate 211 away from the cushion block 22. The reinforcing plate 213 can cover the side of the first substrate 211. The reinforcing plate 213 allows to improve the strength of the first substrate 211, so as to prevent the first substrate 211 from being deformed. In addition, the reinforcing plate 213 can be made of conductive materials such as metals or alloys. When the ToF module 20 is secured on the electronic device 100, the reinforcing plate 213 can be electrically coupled with the casing, to be grounded, and interference of static electricity of external components on the ToF module 20 can be effectively reduced.

Referring to FIGS. 9 to 11, in implementations, the cushion block 22 includes the protrusion portion 225 protruding relative to the side edge 2111 of the first substrate 211. The flexible circuit board 212 is bent around the protrusion portion 225. In an example, a part of the cushion block 22 is directly carried on the first substrate 211, and the other part is free of direct contact with the first substrate 211 and protrudes relative to the side edge 2111 of the first substrate 211 to form the protrusion portion 225. The flexible circuit board 212 can be connected with the side edge 2111. The flexible circuit board 212 is bent around the protrusion portion 225. In other words, the flexible circuit board 212 is bent such that the protrusion portion 225 is located in a space surrounded by the flexible circuit board 212. When the flexible circuit board 212 is subjected to an external force, the flexible circuit board 212 will not collapse inward to cause excessive bending and damage of the flexible circuit board 212.

Further, as illustrated in FIG. 10, in implementations, an outer surface 2251 of the protrusion portion 225 is a smooth curved surface (for example, an outer surface of a cylinder, etc.). That is, the outer surface 2251 of the protrusion portion 225 has no sudden curvature. Even if the flexible circuit board 212 is bent against the outer surface 2251 of the protrusion portion 225, the flexible circuit board 212 will not be over bent, such that the integrity of the flexible circuit board 212 can be ensured.

Referring to FIGS. 5 to 7, in implementations, the ToF module 20 further includes a connector 26 connected with the first substrate 211. The connector 26 is configured to connect with the first substrate assembly 21 and external devices. The connector 26 is connected with one end of the first substrate 211 and the flexible circuit board 212 is connected with the other end of the first substrate 211. The connector 26 can be a jack connector or a plug connector. When the ToF module 20 is mounted inside the housing 101, the connector 26 can be connected with a mainboard of the electronic device 100, such that the ToF module 20 is electrically coupled with the mainboard. The connector 26 is connected to one end of the first substrate 211 and the flexible circuit board 212 is connected to the opposite end of the first substrate 211. For example, the connector 26 and the flexible circuit board 212 may be connected to the left and right ends of the first substrate 211 respectively. Alternatively, the connector 26 and the flexible circuit board 212 may be connected to the front and rear ends of the first substrate 211, respectively.

Referring to FIG. 6 and FIG. 7, in implementations, the light emitter 23 and the light receiver 24 are arranged along line L. The connector 26 is disposed close to one side of line L and the flexible circuit board 212 is disposed close to the other side of line L. It is noted that since the light emitter 23 and the light receiver 24 are arranged in line, the ToF module 20 may have a large length in a direction along line L. The connector 26 is disposed near one side of line L and the flexible circuit board 212 is disposed near the other side of line L, such that the length of the ToF module 20 in the direction along line L will not be further increased, thereby facilitating the installation of the ToF module 20 inside the housing 101 of the electronic device 100.

Referring to FIG. 9 and FIG. 10, in implementations, the cushion block 22 defines the accommodating cavity 223 on the side of the cushion block 22 close to the first substrate 211. The ToF module 20 further includes the electronic component 25 disposed on the first substrate 211. The electronic component 25 is accommodated in the accommodating cavity 223. The electronic component 25 can be a capacitor, an inductor, a transistor, a resistor, etc. The electronic component 25 can be electrically coupled to the control circuits laid on the first substrate 211. The electronic component 25 is configured to drive or control the light emitter 23 or the light receiver 24. The electronic component 25 is received in the accommodating cavity 223. A space inside the cushion block 22 can be reasonably used, such that the electronic component 25 can be received without widening the first substrate 211, which is beneficial to decreasing the overall size of the ToF module 20. The accommodating cavity 223 may be embodied as one or more accommodating cavities. In an example, multiple accommodating cavities 223 may be spaced apart from one another. When installing the cushion block 22, the cushion block 22 is disposed on the first substrate 211 while the accommodating cavity 223 is aligned with the electronic component 25.

Referring to FIG. 9 and FIG. 11, in implementations, the cushion block 22 defines the at least one through hole 224 in communication with the accommodating cavity 223. The at least one electronic component 25 extends into the at least one through hole 224. It is noted that when the electronic component 25 needs to be entirely received in the accommodating cavity 223, the height of the electronic component 25 should not be greater than that of the accommodating cavity 223. When the electronic component 25 has a height greater than the accommodating cavity 223, the at least one through hole 224 in communication with the accommodating cavity 223 can be defined. The electronic component 25 can partially extend into the at least one through hole 224, so as to install the electronic component 25 without increasing the height of the cushion block 22.

Referring to FIG. 9, in implementations, the light emitter 23 includes the second substrate assembly 231, the light source assembly 232, and the case 233. The second substrate assembly 231 is disposed on the cushion block 22 and connected with the flexible circuit board 212. The light source assembly 232 is disposed on the second substrate assembly 231 and configured to emit the light signals. The case 233 is disposed on the second substrate assembly 231 and defines the accommodation space 2331 for accommodating the light source assembly 232. The flexible circuit board 212 may be detachably connected to the second substrate assembly 231. The light source assembly 232 is electrically coupled with the second substrate assembly 231. The case 233 can be bowl-shaped as a whole. The case 233 has an opening which is downwardly and covers on the second substrate assembly 231 to accommodate the light source assembly 232 in the accommodation space 2331. In implementations of the present disclosure, the case 233 defines a through hole 2332 corresponding to the light source assembly 232. The through hole 2332 allows the light signals emitted from the light source assembly 232 to pass through to be directed toward the outside. The light signals can directly pass through the through hole 2332. The light signals may also have optical paths changed by other optical devices and then be directed to pass through the through hole 2332.

Referring to FIG. 9, in implementations, the second substrate assembly 231 includes the second substrate 2311 and the reinforcing member 2312. The second substrate 2311 is connected with the flexible circuit board 212. The light source assembly 232 is disposed on one side of the second substrate 2311 and the reinforcing member 2312 is disposed on the other side of the second substrate 2311. The second substrate 2311 may be a printed circuit board or a flexible circuit board, etc. The second substrate 2311 can be provided with control circuits. The reinforcing member 2312 can be fixedly connected with the second substrate 2311 by means of gluing, riveting, etc. The reinforcing member 2312 can improve the overall strength of the second substrate assembly 231. When the light emitter 23 is disposed on the cushion block 22, the reinforcing member 2312 is in direct contact with the cushion block 22. The second substrate 2311 will not be exposed to the outside, and is free of direct contact with the cushion block 22, such that the second substrate 2311 is not easily contaminated by dust or the like.

As illustrated in FIG. 9, in implementations, the reinforcing member 2312 and the cushion block 22 are formed separately. When assembling the ToF module 20, the cushion block 22 is installed on the first substrate 211 first. At this time, the flexible circuit board 212 has one end connected with the first substrate 211 and the other end connected with the second substrate 2311, and the flexible circuit board 212 is not bent yet (as illustrated in FIG. 11). Then, the flexible circuit board 212 is bent to allow the reinforcing member 2312 to be disposed on the cushion block 22.

In other implementations, the reinforcing member 2312 and the cushion block 22 can be formed integrally, for example, by injection molding. When assembling the ToF module 20, the cushion block 22 and the light emitter 23 can be installed on the first substrate 211 together.

Referring to FIG. 11, in implementations, the reinforcing member 2312 includes the first positioning member 2313. The cushion block 22 includes the body 221 and the second positioning member 222 formed on the body 221. The second substrate assembly 231 is disposed on the cushion block 22. The first positioning member 2313 and the second positioning member 222 cooperate to effectively avoid a relative movement between the second substrate assembly 231 and the cushion block 22. The specific types of first positioning member 2313 and second positioning member 222 can be selected according to requirements. For example, the first positioning member 2313 is a positioning hole defined in the reinforcing member 2312, the second positioning member 222 is a positioning post. The positioning post extends into the positioning hole to allow the first positioning member 2313 and the second positioning member 222 to fit with one another. Alternatively, the first positioning member 2313 is a positioning post formed on the reinforcing member 2312, the second positioning member 222 is a positioning hole, and the positioning post extends into the positioning hole to allow the first positioning member 2313 and the second positioning member 222 to fit with one another. Alternatively, the first positioning member 2313 is embodied as multiple positioning members and the second positioning member 222 is embodied as multiple second positioning members. A part of the first positioning member 2313 are positioning holes, the other part of the second positioning members 222 are positioning posts. A part of the first positioning members 2313 are positioning posts, the other part of the second positioning members 222 are positioning holes. The positioning posts extend into the positioning holes to allow the first positioning member 2313 and the second positioning member 222 to fit with one another.

The structure of the light source assembly 232 will be described below.

Figure 12:
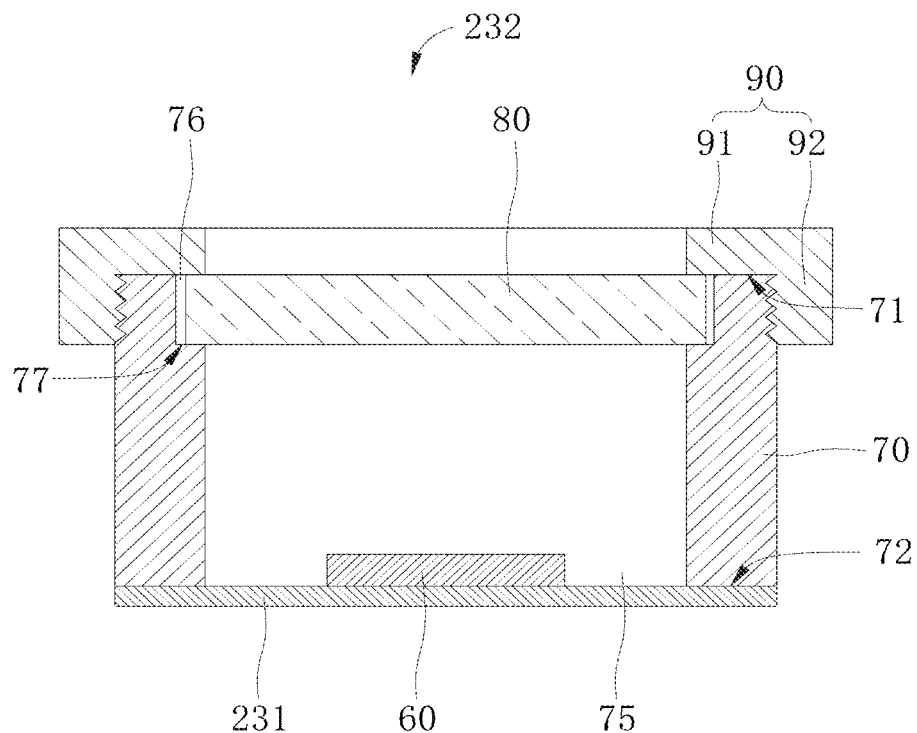
FIGS. 12 to 15 are schematic views of a light emitter according to implementations of the present disclosure.

Referring to FIG. 12, the light source assembly 232 includes a light source 60, a lens barrel 70, a diffuser 80, and a protective cover 90. The light source 60 is connected to the second substrate assembly 231. The lens barrel 70 includes a first surface 71 and a second surface 72 opposite to the first surface 71. The lens barrel 70 defines an accommodating cavity 75 which extends through the first surface 71 and the second surface 72. The lens barrel 70 defines an installation recess 76 which extends from the first surface 71 toward the second surface 72 and is in communication with the accommodating cavity 75. The diffuser 80 is installed inside the installation recess 76. The protective cover 90 is installed at one side of the lens barrel 70 where the first surface 71 is located. The diffuser 80 is sandwiched between the protective cover 90 and a bottom surface 77 of the installation recess 76.

Figure 13:
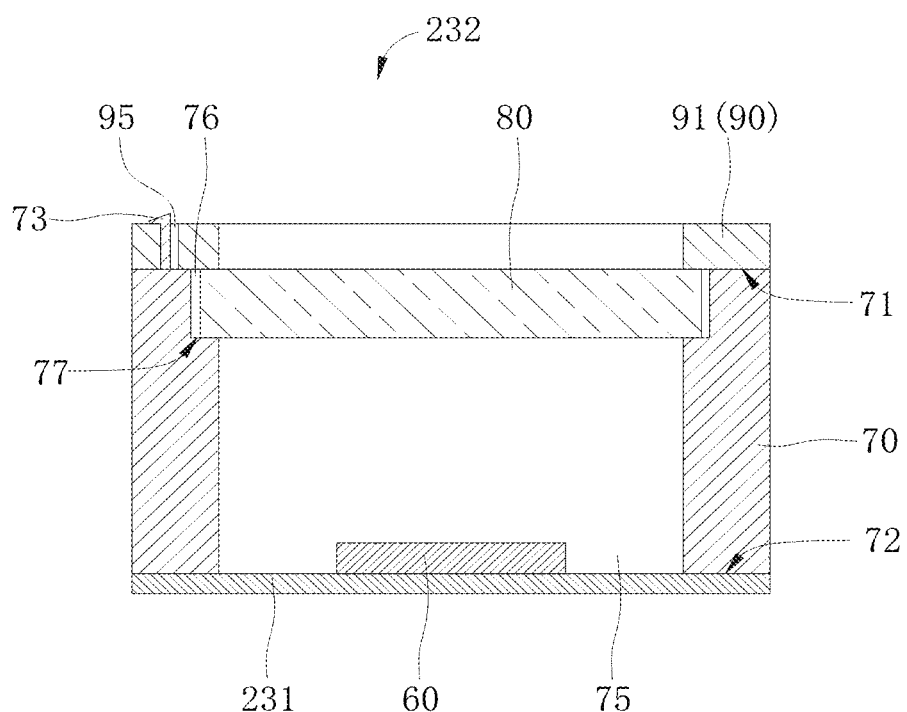
Figure 14:
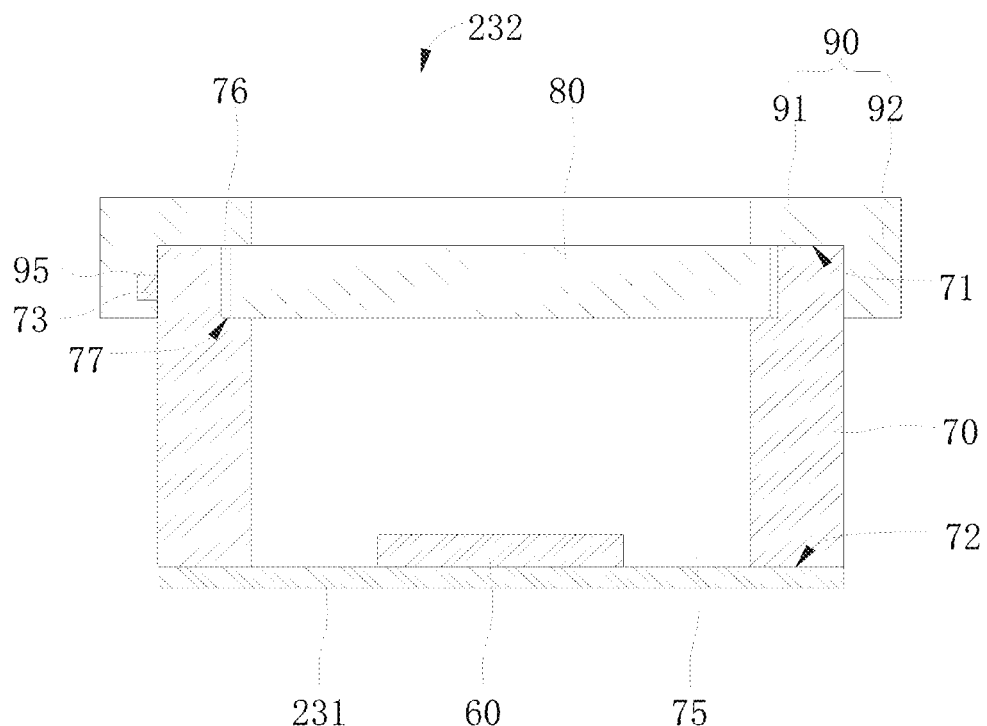
Figure 15:
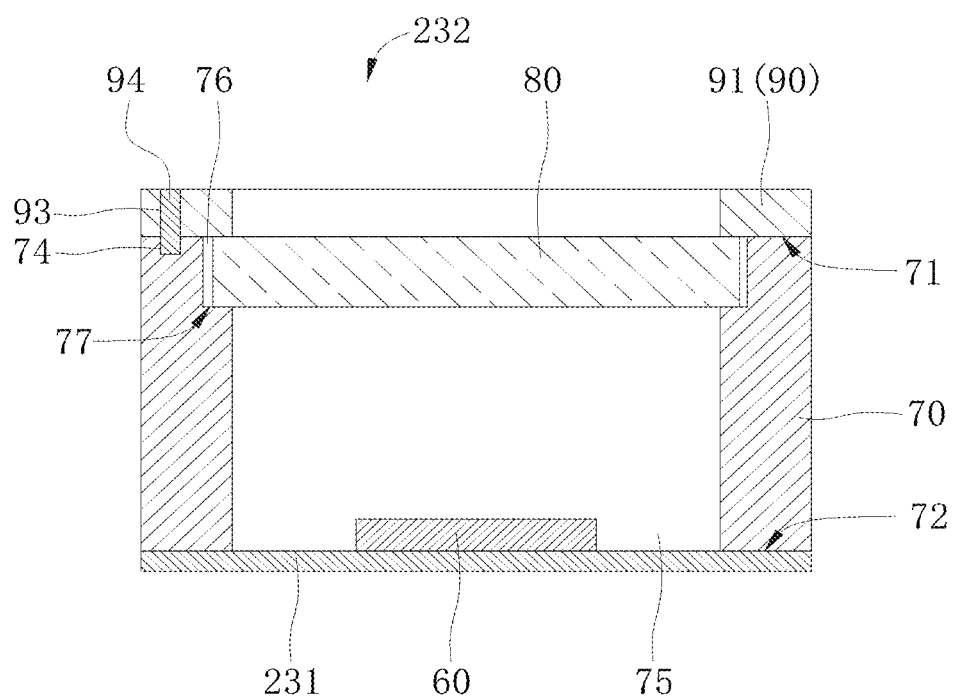

The protective cover 90 can be installed on the lens barrel 70 by means of threaded connection, snapping, and fastener connection. For example, referring to FIG. 12, the protective cover 90 includes a top wall 91 and a protective side wall 92, the protective cover 90 is provided with internal threads (that is, the protective side wall 92 is provided with the internal threads), and the lens barrel 70 is provided with external threads. The internal threads of protective cover 90 are screwed with the external threads of the lens barrel 70 to install the protective cover 90 onto the lens barrel 70. In another implementation, referring to FIG. 13, the protective cover 90 includes the top wall 91. The protective cover 90 defines a hole 95 therein (that is, the top wall 91 defines a hole 95 therein). The lens barrel 70 is provided with a hook 73 at an end of the lens barrel 70. When installing the protective cover 90 onto the lens barrel 70, the hook 73 is snap-fit with the hole 95 such that the protective cover 90 is installed at the lens barrel 70. In another implementation, referring to FIG. 14, the protective cover 90 includes the top wall 91 and the protective side wall 92. The protective cover 90 defines the hole 95 therein (that is, the protective side wall 92 defines the hole 95 therein), and the lens barrel 70 is provided with the hook 73 thereon. When installing the protective cover onto the lens barrel 70, the hook 73 is inserted into the hole 95 such that the protective cover 90 is installed on the lens barrel 70. In another implementation, referring to FIG. 15, the protective cover 90 includes the top wall 91. The lens barrel 70 defines a first positioning hole 74 at one end of the lens barrel 70. The protective cover 90 defines a second positioning hole 93 which corresponds to the first positioning hole 74 therein (that is, the top wall 91 defines the second positioning hole 93 therein). A fastener 94 extends through the second positioning hole 93 and is locked in the first positioning hole 74 to install the protective cover 90 on the lens barrel 70. When the protective cover 90 is installed on the lens barrel 70, the protective cover 90 is abutted against (that is, in close contact with) the diffuser 80 and the diffuser 80 is abutted against the bottom surface 77, such that the diffuser 80 is sandwiched between the protective cover 90 and the bottom surface 77.

In the light source assembly 232, the installation recess 76 is defined in the lens barrel 70, the diffuser 80 is installed in the installation recess 76, and the protective cover 90 is installed on the lens barrel 70 to allow the diffuser 80 to be sandwiched between the protective cover 90 and the bottom surface of the installation recess 76, so as to secure the diffuser 80 on the lens barrel 70. In this way, the diffuser 80 can be fixedly connected on the lens barrel 70 without an adhesive, so as to prevent the adhesive from being volatilized into a gaseous adhesive which will diffuse and solidify on a surface of the diffuser 80 and affect a microstructure of the diffuser 80, and prevent the diffuser 80 from falling off the lens barrel 70 when the adhesive force of the adhesive connecting the diffuser 80 with the lens barrel 70 decreases due to deterioration of the adhesive.

In the description of the present disclosure, descriptions with reference to terms "some implementations", "one implementation", "certain implementations", "examples", "specific examples", or "some examples", and the like mean that specific features, structures, materials, or characteristics described in combination with the implementations or examples are included in at least one implementation or example of the present disclosure. The schematic expressions of the above terms herein do not necessarily refer to the same implementation or example. Moreover, the particular features, structures, materials, or characteristics described may be combined in any suitable manner in any one or more implementations or examples.

In addition, terms "first" and "second" are merely used for descriptive purposes, and should not be understood as indicating or implying relative importance or implicitly indicating the number of technical features indicated. Therefore, the feature defined with the term "first" or "second" may explicitly or implicitly include one or more of the features. In the description of the implementations of the present disclosure, the terms "a plurality of" and "multiple" means that that the number is two or more (for example, two or three), unless otherwise clearly specified.

Although the implementations of the present disclosure have been illustrated and described above, it can be understood that the above implementations are exemplary and cannot be understood as limitations on the present disclosure. Those skilled in the art can make changes, modifications, replacements, and variations for the above implementations within the scope of the present disclosure, and the scope of the present disclosure is defined by the claims and the equivalents thereof.

What is claimed is:

1. An electronic device, comprising:
   a time-of-flight (TOF) module configured to capture a depth image of a subject;
   a color camera configured to capture a color image of the subject;
   a monochrome camera configured to capture a monochrome image of the subject; and
   a processor configured to obtain a current brightness of ambient light in real time, and to construct a three-dimensional image of the subject according to the depth image, the color image, and the monochrome image when the current brightness is less than a first threshold;
   wherein the ToF module comprises:
      a first substrate assembly comprising a first substrate and a flexible circuit board connected with the first substrate;
      a cushion block disposed on the first substrate;
      a light emitter disposed on the cushion block and configured to emit light signals outward, the flexible circuit board being bent with one end connected to the first substrate and another end connected to the light emitter; and
      a light receiver disposed on the first substrate and configured to receive reflected light signals which are emitted by the light emitter, the light receiver comprising a case and an optical element disposed on the case, and the case being connected with the cushion block.

2. The electronic device of claim 1, wherein the ToF module is disposed at one side of the color camera and the monochrome camera is disposed at another side of the color camera.

3. The electronic device of claim 1, wherein the processor is further configured to construct a fused image of the subject according to the color image and the monochrome image when the current brightness is less than the first threshold.

4. The electronic device of claim 1, wherein the processor is further configured to construct a three-dimensional image of the subject according to the depth image and the color image when the current brightness is greater than or equal to the first threshold.

5. The electronic device of claim 4, further comprising a flash, wherein the flash is turned on when the current brightness is greater than or equal to the first threshold and less than a second threshold.

6. The electronic device of claim 1, wherein the light emitter comprises:
- a second substrate assembly disposed on the cushion block and connected with the flexible circuit board;
- a light source assembly disposed on the second substrate assembly and configured to emit the light signals; and
- a case disposed on the second substrate assembly and defining an accommodation space for accommodating the light source assembly.

7. The electronic device of claim 6, wherein the second substrate assembly comprises a second substrate and a reinforcing member, the second substrate being connected with the flexible circuit board, and the light source assembly being disposed on one side of the second substrate and the reinforcing member being disposed on another side of the second substrate.

8. The electronic device of claim 7, wherein:
- the reinforcing member comprises a first positioning member, the cushion block comprises a body and a second positioning member formed on the body; and
- the second substrate assembly is disposed on the cushion block, the first positioning member matches with the second positioning member.

9. The electronic device of claim 1, wherein:
- the cushion block defines an accommodating cavity on a side of the cushion block close to the first substrate; and
- the ToF module further comprises an electronic component disposed on the first substrate, and the electronic component is accommodated in the accommodating cavity.

10. The electronic device of claim 9, wherein the cushion block defines at least one through hole in communication with the accommodating cavity, and at least one electronic component extends into the at least one through hole.

11. The electronic device of claim 1, wherein the cushion block comprises a protrusion portion protruding relative to a side edge of the first substrate, and the flexible circuit board is bent around the protrusion portion.

12. The electronic device of claim 1, wherein:
- the ToF module further comprises a connector connected with the first substrate;
- the connector is configured to connect the first substrate assembly and external devices; and
- the connector is connected with one end of the first substrate and the flexible circuit board is connected with another end of the first substrate.

13. The electronic device of claim 12, wherein:
- the light emitter and the light receiver are arranged along a line; and
- the connector is disposed to one side of the line and the flexible circuit board is disposed to the other side of the line.

14. A method for controlling an electronic device, wherein the electronic device comprises a processor, a time-of-flight (TOF) module, a color camera, and a monochrome camera, and wherein:

the ToF module comprises:
- a first substrate assembly comprising a first substrate and a flexible circuit board connected with the first substrate;
- a cushion block disposed on the first substrate;
- a light emitter disposed on the cushion block and configured to emit light signals outward, the flexible circuit board being bent with one end connected to the first substrate and another end connected to the light emitter; and
- a light receiver disposed on the first substrate and configured to receive reflected light signals which are emitted by the light emitter, the light receiver comprising a case and an optical element disposed on the case, and the case being connected with the cushion block; and the method comprises:
- capturing, by the ToF module, a depth image of a subject;
- capturing, by the color camera, a color image of the subject;
- obtaining, by the processor, a current brightness of ambient light in real time;
- capturing, by the monochrome camera, a monochrome image of the subject when the current brightness is less than a first threshold; and
- constructing, by the processor, a three-dimensional image of the subject according to the depth image, the color image, and the monochrome image.

15. The method of claim 14, wherein the ToF module is disposed at one side of the color camera and the monochrome camera is disposed at another side of the color camera.

16. The method of claim 14, further comprising:
constructing, by the processor, a fused image of the subject according to the color image and the monochrome image when the current brightness is less than the first threshold.

17. The method of claim 14, further comprising:
constructing, by the processor, a three-dimensional image of the subject according to the depth image and the color image when the current brightness is greater than or equal to the first threshold.

18. The method of claim 17, wherein the electronic device further comprises a flash, and the method further comprises:
turning, by the processor, the flash on when the current brightness is greater than or equal to the first threshold but less than a second threshold.

19. The method of claim 14, wherein the depth image, the color image, and the monochrome image are captured at a same time.

* * * * *